Patented Oct. 2, 1928.

1,686,062

UNITED STATES PATENT OFFICE.

CHARLES F. AMACKER, OF BOGALUSA, LOUISIANA.

THERAPEUTIC COMPOSITION.

No Drawing.   Application filed July 8, 1927. Serial No. 204,430.

This invention is an improved composition of matter, of therapeutic value, adapted to be applied as a bactericide to viable organisms as a remedy for and preventive of general application in cases where such compositions are usually employed, for instance, in connection with lacerations, bruises, burns and similar types of wounds, skin diseases and the like, and is also particularly adapted for use as a dentifrice in the form of mouth washes, tooth-paste and in the medical treatment of pyorrhea alveolaris, gingivitis and vincents angina.

Most bactericides, now in general use, which are applicable in the above stated uses, contain an agent which attacks living tissue, when used in quantities or strength sufficient to be effective, thereby causing what is commonly termed as "burns" at the wound and having other disadvantageous effects while seeking to remedy the condition. It has been found that the composition of the present invention does not have the property of destroying the living tissue above referred to, while at the same time is more efficacious than bactericides generally used for the purposes above stated; for instance, in the case of treatment of pyorrhea, where there is flowing pus, granulation of the gingivæ and of the peridental membrane and the reconstruction of the alveolar process has been obtained after three treatments, thus indicating a high degree of utility for the composition of this invention with attending unexpected results.

The compound of this invention may be used in liquid form or may be mixed with a suitable carrier for the purpose of a salve or balm, or as a tooth-paste with one of several suitable bases. When medically treating pyorrhea alveolaris, narrow strips of absorbent material have been saturated with the liquid form of the compound and placed against the gums.

Various other advantages and characteristics of the invention will appear more clearly from a statement of the basic composition which comprises broadly, a salicylate, a halide and an organic mercury derivative of dibromfluorescein in a suitable solvent vehicle, for such latter grain alcohol is preferably employed, although other solvent vehicles could be employed, such as other alcohols, glycerine, and other fluids as carriers.

However, the following gives one example of a specific formula, which has given very satisfactory results, although it should be understood that the invention is not restricted to precise proportions or elements specified by way of example, to wit:

1 pound of salicylic acid
5 fluid ounces tincture of iodine
5 fluid ounces two-per-cent solution of mercurochrome (disodium salt of dibromhydroxymercuifluorescein).

These elements are mixed together by stirring or agitation in approximately seven pints of alcohol, or other suitable vehicle or carrier; and while definite proportions are above set forth, the same may be varied within wide limits without detriment to the efficaciousness of the composition.

The present composition is found to lack materially, if not entirely, in the intense stinging or smarting sensation when applied to delicate tissue, in contradistinction to alcohol, mercurochrome, or iodine in their ordinary state and leaves no objectionable stain on the parts to which it is applied. This, coupled with the advantages above set forth, of not destroying living tissue, but yet effecting a more rapidly acting treatment or remedy than its individual ingredients, indicates a reaction between the elements of the compound. It is believed that there is a chemical reaction between the iodine and salicylic acid, as well as between the iodine and the mercurochrome, which is a mercury organic compound (i. e. disodium salt of dibromhydroxymercurifluorescein), or among all three elements. However, irrespective of any explanation of the exact action or interaction between the elements of the compound, it has been found to be a fact, by clinical experiments, that the compound possesses the characteristics and properties above set forth, which is more than those attributable to the simple sum of the individual properties.

Having thus described the invention and the manner in which the same is to be performed, what is claimed as new and upon which Letters Patent is desired, is:

1. A new product having therapeutic properties including a mercury derivative of di-brom-fluorescein and iodine.

2. A new product having therapeutic properties including a salicylic acid, iodine and a mercury derivative of di-brom-fluorescein.

3. A new product having therapeutic properties including substantially in the proportions of one-pound salicylic acid, five fluid ounces tincture iodine and five fluid ounces two per cent solution of mercurochrome in a solvent vehicle.

In testimony whereof I have hereunto set my hand.

CHARLES F. AMACKER.